US012607211B2

(12) United States Patent
Mitsunobu et al.

(10) Patent No.: US 12,607,211 B2
(45) Date of Patent: Apr. 21, 2026

(54) WELDED JOINT AND AUTOMOBILE MEMBER

(71) Applicant: NIPPON STEEL CORPORATION, Tokyo (JP)

(72) Inventors: Takuya Mitsunobu, Tokyo (JP); Hiroshi Takebayashi, Tokyo (JP); Takehiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 310 days.

(21) Appl. No.: 18/271,402

(22) PCT Filed: Dec. 24, 2021

(86) PCT No.: PCT/JP2021/048411
§ 371 (c)(1),
(2) Date: Jul. 7, 2023

(87) PCT Pub. No.: WO2022/149511
PCT Pub. Date: Jul. 14, 2022

(65) Prior Publication Data
US 2024/0084833 A1 Mar. 14, 2024

(30) Foreign Application Priority Data
Jan. 8, 2021 (JP) ................................. 2021-001927

(51) Int. Cl.
*B32B 15/01* (2006.01)
*B23K 11/11* (2006.01)
(Continued)

(52) U.S. Cl.
CPC ................ *F16B 5/08* (2013.01); *B23K 11/11* (2013.01); *B62D 27/02* (2013.01); *B62D 29/00* (2013.01)

(58) Field of Classification Search
None
See application file for complete search history.

(56) References Cited

U.S. PATENT DOCUMENTS 10,350,701 B2 7/2019 Miyazaki et al.
2007/0190353 A1 8/2007 Taniguchi et al.
(Continued)

FOREIGN PATENT DOCUMENTS

AT 412878 B 8/2005
EP 3 733 924 A1 11/2020
(Continued)

*Primary Examiner* — Daniel J. Schleis
(74) *Attorney, Agent, or Firm* — Birch, Stewart, Kolasch & Birch, LLP

(57) ABSTRACT

The present disclosure inhibits liquid metal embrittlement (LME) cracking and improves corrosion resistance in a welded joint obtained by spot welding a first steel sheet and a second steel sheet. In the welded joint of the present disclosure, a first plating layer is provided on a surface of the first steel sheet facing the second steel sheet, no plating layer is present on or a second plating layer is provided on a surface of the second steel sheet facing the first steel sheet, a boundary plating layer is provided between the first steel sheet and the second steel sheet in a range of 0.5 mm from an end part of the corona bond of the spot welded part toward an outside of the spot welded part, and a Zn penetrated part is present at least at one of the first steel sheet and the second steel sheet adjoining the boundary plating layer. The Zn penetrated part advances from the boundary plating layer along the steel grain boundary, an Mg concentration at a front end of the Zn penetrated part at a location where a Zn concentration is 0.1 mass % is 0.20 mass % or less, and the first plating layer and the second plating layer satisfy a predetermined Relation I.

17 Claims, 3 Drawing Sheets

(51) Int. Cl.

| | |
|---|---|
| *B62D 27/02* | (2006.01) |
| *F16B 5/08* | (2006.01) |
| *B62D 29/00* | (2006.01) |

(56) References Cited

U.S. PATENT DOCUMENTS

| | | | |
|---|---|---|---|
| 2010/0055344 | A1 | 3/2010 | Ostwald et al. |
| 2015/0232977 | A1 | 8/2015 | Sato et al. |
| 2018/0079026 | A1 | 3/2018 | Miyazaki et al. |
| 2018/0243853 | A1 | 8/2018 | Yoshinaga et al. |
| 2019/0001429 | A1 | 1/2019 | Sawanishi et al. |
| 2020/0002803 | A1 | 1/2020 | Kwak et al. |
| 2020/0325554 | A1 * | 10/2020 | Takeda .................. C21D 6/001 |
| 2020/0399745 | A1 | 12/2020 | Kwak et al. |
| 2022/0049330 | A1 | 2/2022 | Tanaka et al. |
| 2023/0349022 | A1 | 11/2023 | Suzuki et al. |

FOREIGN PATENT DOCUMENTS

| | | | | |
|---|---|---|---|---|
| EP | 4 276 206 A1 | 11/2023 | | |
| JP | 4-218661 A | 8/1992 | | |
| JP | 2002-105614 A | 4/2002 | | |
| JP | 2004-18971 A | 1/2004 | | |
| JP | 2005-103608 A | 4/2005 | | |
| JP | 2008-38168 A | 2/2008 | | |
| JP | 2011-117041 A | 6/2011 | | |
| JP | 2017-47475 A | 3/2017 | | |
| JP | 6750762 B1 | 9/2020 | | |
| JP | 2020179413 A | * 11/2020 | | |
| KR | 10-2018-0081581 A | 7/2018 | | |
| WO | WO-2019116531 A1 | * 6/2019 | ............ | C23C 2/024 |
| WO | WO 2020/130079 A1 | 6/2020 | | |
| WO | WO 2022/071305 A1 | 4/2022 | | |
| WO | WO 2022/149511 A1 | 7/2022 | | |

\* cited by examiner

<u>100</u>

GRAIN BOUNDARY                    GRAIN BOUNDARY

<u>1000</u>

WELDED JOINT AND AUTOMOBILE MEMBER

FIELD

The present application discloses a welded joint and an automobile member.

BACKGROUND

When joining a plurality of plated steel sheets by spot welding, the metal components in the plating layers penetrate the grain boundaries of the steel sheets and sometimes causes liquid metal embrittlement (LME) cracking. LME cracking becomes a problem particularly in high strength steel sheets.

As art for inhibiting LME cracking at the time of spot welding, PTL 1 discloses the art of determining a holding time of welding electrodes after welding based on a function of the total sheet thickness at the time of spot welding. Further, while not art directly related to LME cracking, PTL 2 discloses the art of ultrasonic impact treatment of spot welded parts, opening up cracks of the welded parts, and inhibiting penetration of moisture into the cracks.

CITATIONS LIST

Patent Literature

[PTL 1] Japanese Unexamined Patent Publication No. 2017-047045
[PTL 2] Japanese Unexamined Patent Publication No. 2005-103608

SUMMARY

Technical Problem

In the prior art, LME cracking has been inhibited by processes or operations in the spot welding. On the other hand, inhibiting LME cracking by specially designing the plated steel sheets themselves has not been sufficiently studied. On this point, there is room for improvement regarding the inhibition of LME cracking in welded joints.

Further, in the prior art, securing the corrosion resistance of welded joints has not been sufficiently studied. On this point, there is room for improvement regarding achievement of both inhibition of LME cracking and securing of corrosion resistance in welded joints.

Solution to Problem

The present application discloses, as means for solving the above problem, a welded joint comprising a first steel sheet, a second steel sheet, and a spot welded part joining the first steel sheet and the second steel sheet, wherein, a first plating layer is provided on a surface of the first steel sheet facing the second steel sheet, no plating layer is present on or a second plating layer is provided on a surface of the second steel sheet facing the first steel sheet, the spot welded part has a nugget and corona bond, a boundary plating layer is provided between the first steel sheet and the second steel sheet in a range of 0.5 mm from an end part of the corona bond toward an outside of the spot welded part, a Zn penetrated part is present at least at one of the first steel sheet and the second steel sheet adjoining the boundary plating layer, the Zn penetrated part advances from the boundary plating layer along the steel grain boundary, an Mg concentration at a front end of the Zn penetrated part at a location where a Zn concentration is 0.1 mass % is 0.20 mass % or less, and the first plating layer and the second plating layer satisfy the following Relation I, $$0.010 \geq [(\text{Mg composition of the first plating layer} \\ (\text{mass \%})) \times (\text{amount of deposition of the first} \\ \text{plating layer (g/m}^2)) + (\text{Mg composition of the} \\ \text{second plating layer (mass \%))} \times (\text{amount of} \\ \text{deposition of the second plating layer (g/m}^2))] / \\ [(\text{Zn composition of the first plating layer (mass} \\ \%)) \times (\text{amount of deposition of the first plating} \\ \text{layer (g/m}^2)) + (\text{Zn composition of the second} \\ \text{plating layer (mass \%))} \times (\text{amount of deposition} \\ \text{of the second plating layer (g/m}^2))] \geq 0.001 \qquad \text{Relation I:}$$

where, if no second plating layer is present, the Mg composition, Zn composition, and amount of deposition of the second plating layer are 0.

In the welded joint of the present disclosure, the first plating layer and the second plating layer may satisfy the following Relation I-1.

$$0.006 \geq [(\text{Mg composition of the first plating layer} \\ (\text{mass \%})) \times (\text{amount of deposition of the first} \\ \text{plating layer (g/m}^2)) + (\text{Mg composition of the} \\ \text{second plating layer (mass \%))} \times (\text{amount of} \\ \text{deposition of the second plating layer (g/m}^2))] / \\ [(\text{Zn composition of the first plating layer (mass} \\ \%)) \times (\text{amount of deposition of the first plating} \\ \text{layer (g/m}^2)) + (\text{Zn composition of the second} \\ \text{plating layer (mass \%))} \times (\text{amount of deposition} \\ \text{of the second plating layer (g/m}^2))] \geq 0.001 \qquad \text{Relation I-1:}$$

In the welded joint of the present disclosure, one or more oxides with a long diameter of 0.5 μm or more may present in the boundary plating layer.

The welded joint of the present disclosure may be one having an internal oxide layer of a depth of 1.5 μm or more and 20.0 μm or less on the surface side of the first steel sheet facing the second steel sheet.

In the welded joint of the present disclosure, the tensile strength of any of the first steel sheet and the second steel sheet which has the Zn penetrated part may be 590 MPa or more.

The welded joint of the present disclosure may be applied to for example an automobile member. For example, the automobile member of the present disclosure may comprise the above welded joint of the present disclosure, where the first steel sheet is arranged at the outer side of the vehicle, the second steel sheet is arranged at the inner side of the vehicle, and the Mg composition of the second plating layer is lower than the Mg composition of the first plating layer.

In the automobile member of the present disclosure, the [Mg composition of the first plating layer (mass %)]/[Zn composition of the first plating layer (mass %)] may be larger than 0.01.

Advantageous Effects of Invention

In the welded joint of the present disclosure, inhibition of LME cracking and securing of corrosion resistance are easily both realized.

DESCRIPTION OF EMBODIMENTS

1. Welded Joint

Figure 1:
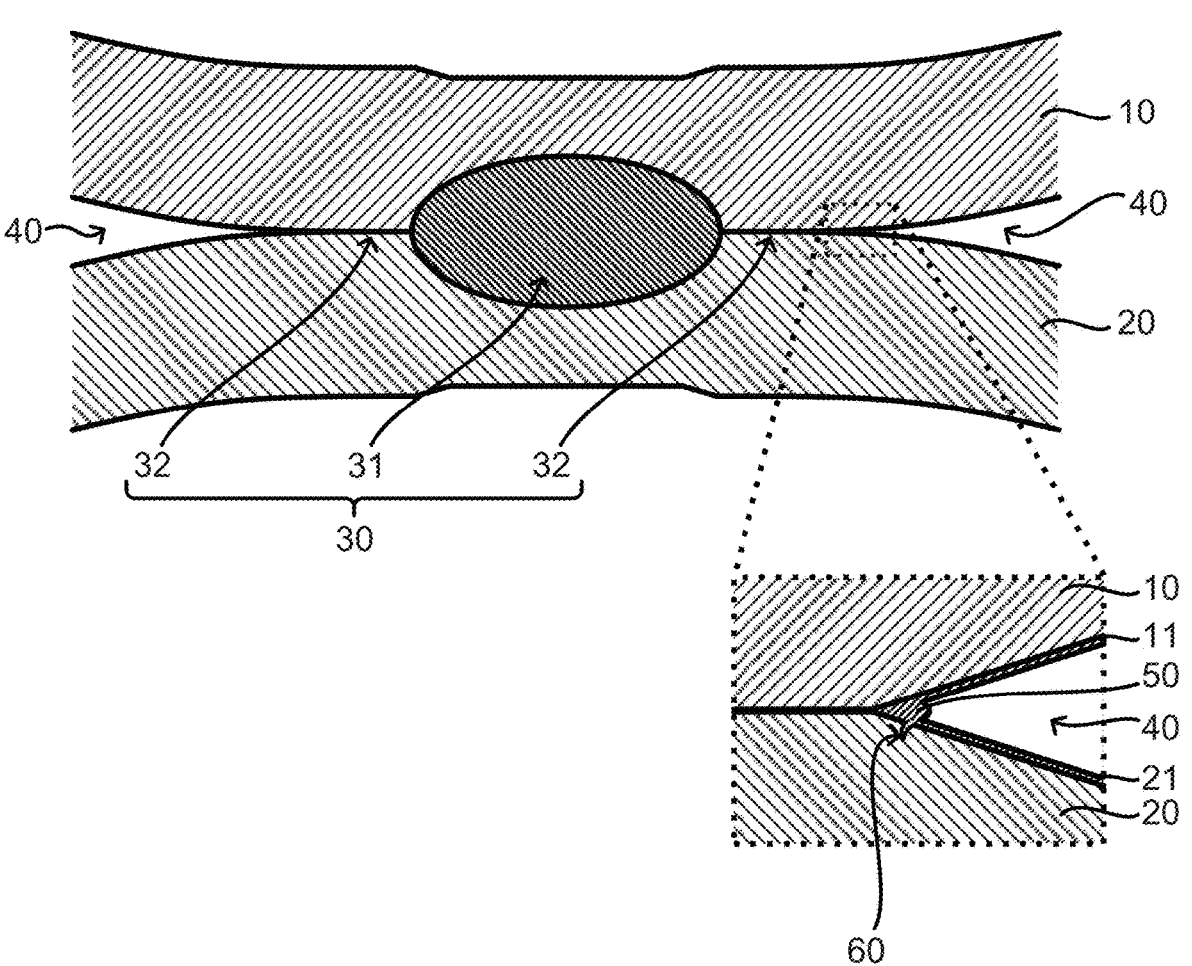
FIG. 1 schematically shows one example of the cross-sectional configuration of a welded joint.
Figure 2:
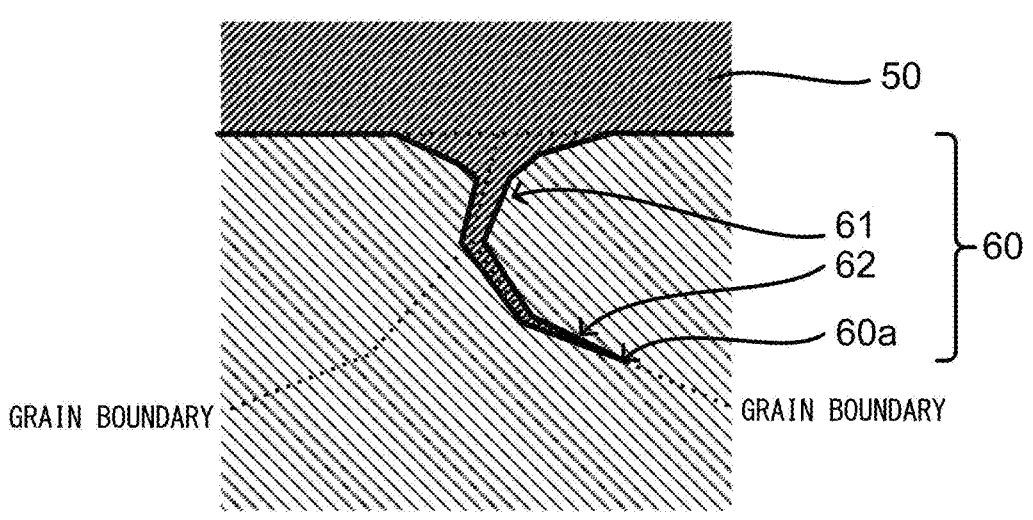
FIG. 2 schematically shows one example of the cross-sectional configuration of a Zn penetrated part.
Figure 3:
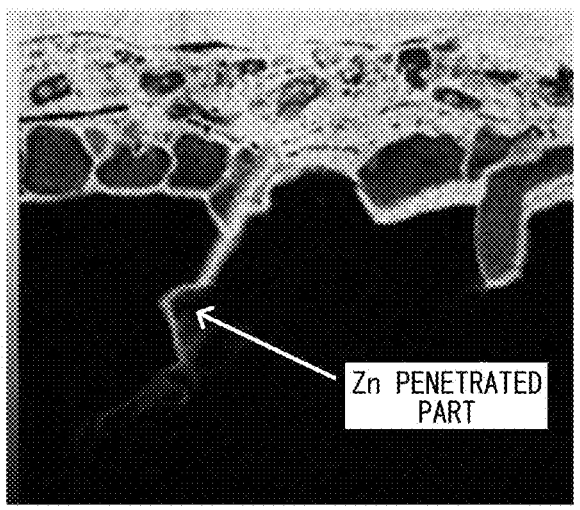
FIG. 3 shows one example of the cross-sectional configuration of a Zn penetrated part.

As shown in FIGS. 1 to 3, a welded joint 100 has a first steel sheet 10, a second steel sheet 20, and a spot welded part 30 joining the first steel sheet 10 and second steel sheet 20. Here, a first plating layer 11 is provided on the surface of the first steel sheet 10 facing the second steel sheet 20. No plating layer is present on or a second plating layer 21 is provided on the surface of the second steel sheet 20 facing the first steel sheet 10. The spot welded part 30 has a nugget 31 and a corona bond 32. A boundary plating layer 50 is provided between the first steel sheet 10 and the second steel sheet 20 in a range of 0.5 mm from an end part of the corona bond 32 toward the outside of the spot welded part 30. A Zn penetrated part 60 is present at least at one of the first steel sheet 10 and the second steel sheet 20 adjoining the boundary plating layer 50. The Zn penetrated part 60 advances from the boundary plating layer along the steel grain boundary. In the welded joint 100, the Mg concentration at the front end of the Zn penetrated part at a location where the Zn concentration is 0.1 mass % is 0.20 mass % or less, and the first plating layer and the second plating layer satisfy the following Relation I.

> 0.010≥[(Mg composition of the first plating layer (mass %))×(amount of deposition of the first plating layer (g/m²))+(Mg composition of the second plating layer (mass %))×(amount of deposition of the second plating layer (g/m²))]/ [(Zn composition of the first plating layer (mass %))×(amount of deposition of the first plating layer (g/m²))+(Zn composition of the second plating layer (mass %))×(amount of deposition of the second plating layer (g/m²))]0.001    Relation I:

where, if no second plating layer is present, the Mg composition, Zn composition, and amount of deposition of the second plating layer are 0.

1.1. Steel Sheets

The first steel sheet 10 and second steel sheet 20 may be ones having low tensile strengths or may be ones having high ones, but if at least one of the first steel sheet 10 and second steel sheet 20 is a high strength steel sheet with a high tensile strength, a high LME cracking inhibition effect can be expected. For example, in the welded joint 100, at least one of the first steel sheet 10 and second steel sheet 20 may have a 590 MPa or more tensile strength. That is, in the welded joint 100, the tensile strength of the first steel sheet 10 may be 590 MPa or more and the tensile strength of the second steel sheet 20 may be less than 590 MPa, the tensile strength of the first steel sheet 10 may be less than 590 MPa and the tensile strength of the second steel sheet may be 590 MPa or more, or the tensile strengths of both of the first steel sheet 10 and second steel sheet 20 may be 590 MPa or more. The first steel sheet 10 and the second steel sheet 20 may have mutually the same extents of tensile strengths or may have mutually different tensile strengths. Further, in the welded joint 100, at least one of the first steel sheet 10 and second steel sheet 20 may have a 780 MPa or more, 980

MPa or more, 1180 MPa or more, or 1470 MPa or more tensile strength. Further, in the welded joint 100, among the first steel sheet 10 and second steel sheet 20, the one having the later explained Zn penetrated part 60 may have a tensile strength of 590 MPa or more, 780 MPa or more, 980 MPa or more, 1180 MPa or more, or 1470 MPa or more. The upper limit of the tensile strength is not particularly prescribed, but, for example, may be 2500 MPa or less, 2200 MPa or less, or 2000 MPa or less. Further, the "tensile strength" of the steel sheets referred to in the present application is based on ISO 6892-1: 2009.

Regardless of the chemical compositions and metal structures of the first steel sheet 10 and second steel sheet 20, the effect of the welded joint 100 of the present disclosure is exhibited. The chemical compositions and metal structures of the steel sheets 10, 20 may be suitably determined in accordance with the application of the welded joint 100 etc. The first steel sheet 10 or the second steel sheet 20 may, for example, have a chemical composition containing, by mass %, C: 0.01 to 0.50%, Si: 0.01 to 3.50%, Mn: 0.10 to 5.00%, P: 0.100% or less, S: 0.0300% or less, N: 0.0100% or less, O: 0 to 0.020%, Al: 0 to 1.000%, B: 0 to 0.010%, Nb: 0 to 0.150%, Ti: 0 to 0.20%, Mo: 0 to 3.00%, Cr: 0 to 2.00%, V: 0 to 1.00%, Ni: 0 to 2.00%, W: 0 to 1.00%, Ta: 0 to 0.10%, Co: 0 to 3.00%, Sn: 0 to 1.00%, Sb: 0 to 0.50%, Cu: 0 to 2.00%, As: 0 to 0.050%, Mg: 0 to 0.100%, Ca: 0 to 0.100%, Zr: 0 to 0.100%, Hf: 0 to 0.100%, and REM: 0 to 0.100% and having a balance of Fe and impurities. Further, in the above chemical composition, the lower limit of content of the optionally added elements may be 0.0001% or 0.001%.

The thicknesses of the first steel sheet 10 and second steel sheet 20 are not particularly limited. The sheet thicknesses may be suitably determined in accordance with the application. The sheet thicknesses may be, for example, 0.5 mm or more, 0.8 mm or more, 1.0 mm or more, 1.2 mm or more, or 2.0 mm or more and may be 10.0 mm or less, 5.0 mm or less, 4.0 mm or less, or 3.0 mm or less. The sheet thicknesses may be the same at the entirety of the steel sheets or may be different for each portion of the steel sheets.

1.2. Plating Layers

In the welded joint 100, a first plating layer 11 is provided on the surface of the first steel sheet 10 facing the second steel sheet 20. Further, no plating layer is present on or a second plating layer 21 is provided on the surface of the second steel sheet 20 facing the first steel sheet 10. FIG. 1 shows a mode where both of the first plating layer 11 and second plating layer 21 are provided, but the mode of the platting layers at the welded joint 100 is not limited to this. In the welded joint 100, the first steel sheet 10 and second steel sheet 20 need only be welded while sandwiching the plating layer. Further, there may be a plating layer or may not be one on the surface of the first steel sheet 10 not facing the second steel sheet 20. Further, there may be a plating layer or may not be one on the surface of the second steel sheet 20 not facing the first steel sheet 10. The first plating layer 11 and the second plating layer 21 may be mutually the same types or may be different types. The chemical compositions of the first plating layer 11 and second plating layer 21 are not particularly limited so long as the later explained Relation I is satisfied and a predetermined Mg concentration is satisfied at a front end part 60a of a Zn penetrated part 60. The first plating layer 11 and second plating layer 21 may be Zn-based platings. For example, they may have the following chemical compositions.

(Al: 0 to 90.0%)

By including Al in a plating layer, sometimes the corrosion resistance of the plating layer is improved. The Al content at each of the first plating layer 11 and second plating layer 21 may be, by mass %, 0% or may be 0.010% or more, 0.100% or more, 0.500% or more, 1.0% or more, or 3.0% or more. Further, the Al content at each of the first plating layer 11 and second plating layer 21 may be, by mass %, 90.0% or less, 80.0% or less, 70.0% or less, 60.0% or less, 50.0% or less, 40.0% or less, 30.0% or less, 20.0% or less, 10.0% or less, or 5.0% or less. In the welded joint 100, one or both of the first plating layer 11 and second plating layer 21 may be one not containing Al, or one or both of the first plating layer 11 and second plating layer 21 may be one containing Al.

(Mg: 0 to 60.0%)

By including Mg in a plating layer, sometimes the corrosion resistance of the plating layer is improved. The content of Mg at each of the first plating layer 11 and second plating layer 21 may be, by mass %, 0% or may be 0.010% or more, 0.100% or more, 0.500% or more, 1.0% or more, or 3.0% or more. Further, the content of Mg at each of the first plating layer 11 and second plating layer 21 may be, by mass %, 60.0% or less, 50.0% or less, 40.0% or less, 30.0% or less, 20.0% or less, 10.0% or less, or 5.0% or less. However, as self evident from the Relation I, at least one of the first plating layer 11 and second plating layer 21 contains Mg. The content of Mg in the plating layer containing Mg among the first plating layer 11 and second plating layer 21 may be, for example, by mass %, 0.100% or more, 0.500% or more, 0.800% or more, or 1.0% or more and may be 60.0% or less, 40.0% or less, 20.0% or less, or 5.0% or less. In the welded joint 100, one or both of the first plating layer 11 and second plating layer 21 may be one not containing Mg, or one or both of the first plating layer 11 and second plating layer 21 may be one containing Mg.

(Fe: 0 to 65.0%)

If forming a plating layer on the surface of a steel sheet, then heat treating it, sometimes Fe diffuses from the steel sheet to the plating layer. The content of Fe at each of the first plating layer 11 and second plating layer 21 may be, by mass %, 0% or may be 1.0% or more, 2.0% or more, 3.0% or more, 4.0% or more, or 5.0% or more. Further, the content of Fe at each of the first plating layer 11 and second plating layer 21 may be, by mass %, 65.0% or less, 55.0% or less, 45.0% or less, 35.0% or less, 25.0% or less, 15.0% or less, 12.0% or less, 10.0% or less, 8.0% or less, or 6.0% or less.

(Si: 0 to 10.0%)

By making a plating layer contain Si, sometimes the corrosion resistance of the plating layer is improved. The content of Si at each of the first plating layer 11 and second plating layer 21 may be, by mass %, 0% and may be 0.005% or more, 0.010% or more, 0.050% or more, or 0.100% or more. Further, the content of Si at each of the first plating layer 11 and second plating layer 21 may be, by mass %, 10.0% or less, 8.0% or less, 5.0% or less, 3.0% or less, 2.5% or less, 2.0% or less, 1.5% or less, or 1.0% or less.

(Others)

The first plating layer 11 and second plating layer 21 may respectively optionally contain, by mass %, one or more of Sb: 0 to 0.50%, Pb: 0 to 0.50%, Cu: 0 to 1.0%, Sn: 0 to 1.0%, Ti: 0 to 1.0%, Sr: 0 to 0.50%, Cr: 0 to 1.0%, Ni: 0 to 1.0%, and Mn: 0 to 1.0%. The total content of these optionally added elements may, for example, be 5.0% or less or 2.0% or less.

In the first plating layer 11 and second plating layer 21, the balances other than the above components may be comprised of Zn and impurities. As the impurities in the first plating layer 11 and second plating layer 21, the raw materials and other components entering due to various reasons in the step of formation of the first plating layer 11 and second plating layer 21 when forming the same may be mentioned. In the first plating layer 11 and second plating layer 21, elements other than the elements explained above may be included in trace amounts.

The chemical composition of a plating layer can be identified by dissolving the plating layer in an acid solution containing an inhibitor for inhibiting corrosion of the steel material and measuring the obtained solution by ICP (induction coupling plasma) spectrometry.

The thickness of each of the first plating layer 11 and second plating layer 21 may, for example, be 3 μm or more and may be 50 μm or less. Further, the amount of deposition of each of the first plating layer 11 and second plating layer 21 is not particularly limited, but, for example, may be 10 g/m² or more per side of the steel sheet or may be 170 g/m² or less. The amount of deposition of the plating layer is determined by dissolving the plating layer in an acid solution containing an inhibitor for inhibiting corrosion of the ground iron and calculating the change in weight before and after pickling.

(Relation I)

In the welded joint 100, the first plating layer 11 and second plating layer 21 satisfy the following Relation I. In other words, the average Mg/Zn obtained by the weighted average of the components contained in the first plating layer 11 and second plating layer 21 considering the amounts of deposition of the plating layers satisfy the following Relation I. Further, in the present disclosure, when referring to the "average" relating to the chemical composition, this weighted average is meant.

$$0.010 \geq [(\text{Mg composition of the first plating layer} \\ (\text{mass \%})) \times (\text{amount of deposition of the first} \\ \text{plating layer } (g/m^2)) + (\text{Mg composition of the} \\ \text{second plating layer } (\text{mass \%})) \times (\text{amount of} \\ \text{deposition of the second plating layer } (g/m^2))] / \\ [(\text{Zn composition of the first plating layer } (\text{mass} \\ \%)) \times (\text{amount of deposition of the first plating} \\ \text{layer } (g/m^2)) + (\text{Zn composition of the second} \\ \text{plating layer } (\text{mass \%})) \times (\text{amount of deposition} \\ \text{of the second plating layer } (g/m^2))] \geq 0.001 \quad \text{Relation I:}$$

The Relation I means that, in the welded joint 100, the mass ratio of Mg to Zn (average Mg/Zn), in the case of averaging the chemical composition of the first plating layer 11 and the chemical composition of the second plating layer 21, is 0.001 or more and 0.010 or less. By the average Mg/Zn being such a range, a more excellent LME cracking inhibition effect and corrosion resistance can be secured. The lower limit in the Relation I may also be 0.002 or more or 0.003 or more. The upper limit may be 0.009 or less, 0.008 or less, 0.007 or less, 0.006 or less, or 0.005 or less. In particular, if the first plating layer 11 and second plating layer 21 satisfy the following Relation I-1, a higher LME cracking inhibition effect and corrosion resistance can be expected.

$$0.006 \geq [(\text{Mg composition of the first plating layer} \\ (\text{mass \%})) \times (\text{amount of deposition of the first} \\ \text{plating layer } (g/m^2)) + (\text{Mg composition of the} \\ \text{second plating layer } (\text{mass \%})) \times (\text{amount of} \\ \text{deposition of the second plating layer } (g/m^2))] / \\ [(\text{Zn composition of the first plating layer } (\text{mass} \\ \%)) \times (\text{amount of deposition of the first plating} \\ \text{layer } (g/m^2)) + (\text{Zn composition of the second} \\ \text{plating layer } (\text{mass \%})) \times (\text{amount of deposition} \\ \text{of the second plating layer } (g/m^2))] \geq 0.001 \quad \text{Relation I-1:}$$

Further, as explained above, in the welded joint 100, the second plating layer 21 may not be present. That is, in the above Relation I, if no second plating layer 21 is present, the Mg composition, Zn composition, and amount of deposition of the second plating layer 21 are 0. Whether the above Relation I is satisfied in the welded joint 100 can be judged by measuring the chemical compositions and amounts of deposition of the first plating layer 11 and second plating layer 21 provided at the welded joints 100. The chemical compositions and amounts of deposition of the first plating layer 11 and second plating layer 21 may, for example, be confirmed at parts of the plating layers 11, 21 sufficiently away from the spot welded part 30.

1.3. Spot Welded Part

In the welded joint 100, the first steel sheet 10 and second steel sheet 20 are joined by the spot welded part 30. As shown in FIG. 1, when the first steel sheet 10 and second steel sheet 20 are spot welded, the part which is pressed by the electrodes is formed with a part called a "nugget 31" comprised of the steel component and/or the plating layer component which is melted then solidified. Further, in the surroundings of the nugget 31, a corona bond 32 to which the component is joined without melting is formed. Note that, a "corona bond" is a part formed in the surroundings of the nugget where the first steel sheet and second steel sheet are press bonded. Usually, the plating layer at the location of the corona bond is pushed out to the surroundings of the corona bond at the time of formation of the corona bond. Zn may remain at the corona bond. In this case, Zn remains in a state dissolved at the first steel sheet and second steel sheet. Even if Zn is dissolved there, at the corona bond, the first steel sheet and second steel sheet contact each other without a gap, so the end part of the corona bond can be judged. Further, the later explained Zn penetrated part is never formed from the Zn dissolved at the corona bond. This is because dissolved Zn is present as an $\alpha$-(Fe,Zn) phase even at a high temperature and Zn never precipitates. The nugget 31 and corona bond 32 differ in chemical compositions, so for example can be easily discriminated by a reflected electron image (BSE image) of a scan electron microscope (SEM). The shape and composition of the nugget 31 at the welded joint 100 are not particularly limited.

1.4. Separation Part

In the welded joint 100, there is a separation part 40 present in the surroundings of the spot welded part 30 (surroundings of corona bond 32). A "separation part 40" means a part with no welding by spot welding or press bonding. That is, a "separation part" means a part where the first steel sheet and second steel sheet in the surroundings of the corona bond are not directly in contact. For example, as shown in FIG. 1, at the separation part 40 in the surroundings of the spot welded part 30, the first steel sheet 10 and second steel sheet 20 are not welded or press bonded and there may be a gap between the first steel sheet 10 and second steel sheet 20. The size of the gap at the separation part 40 is not particularly limited.

1.5. Boundary Plating Layer

The "boundary plating layer" is a plating layer melted and solidified by the weld input heat at the surroundings of the corona bond. The boundary plating layer also means boundary part. At the welded joint 100, the boundary plating layer 50 is included in a range of 0.5 mm from the end part of the corona bond 32 toward the outside of the spot welded part 30. That is, among the plating layers 11, 21 present at the facing surfaces of the first steel sheet 10 and second steel sheet 20, the plating layers in the section of 0.5 mm from the end part of the corona bond 32 toward the outside of the spot welded part 30 become the boundary plating layer 50 due to the spot welding. Further, the plating layers at the location forming the corona bond 32 are pushed out to the outside of the corona bond at the time of spot welding and form parts of the boundary plating layer 50. If the weld input heat of the spot welding is high, the section which becomes the boundary plating layer 50 becomes further enlarged toward the outside of the spot welding. Further, if there is no plating layer at the surface of the second steel sheet 20 facing the first steel sheet 10, at the second steel sheet 20 side of the separation part 40 adjoining the corona bond 32, the plating layer of the first steel sheet may melt and spread to form the boundary plating layer 50. The boundary plating layer 50, as shown in FIG. 1, may have a fan shaped (semicircular) cross-sectional shape and may have other shapes. The shape of the boundary plating layer 50 may change depending on the spot welding conditions etc.

In the welded joint 100, the boundary plating layer 50 includes components derived from the first plating layer 11 and second plating layer 21. That is, the boundary plating layer 50 can be formed by solidification of the plating layers 11, 21 etc. melted by spot welding. For example, if both the first plating layer 11 and second plating layer 21 are present, at the boundary plating layer 50, the components derived from the two plating layers 11, 21 and the components derived from the steel sheets are mixed together. That is, at the boundary plating layer 50, there may be components derived from the steel sheets 10, 20 in addition to components derived from the first plating layer 11 and second plating layer 21. The chemical composition of the boundary plating layer 50, when removing components derived from the steel sheets, may correspond to the average composition of the first plating layer 11 and second plating layer 21 provided at the welded joint 100. However, according to findings of the present inventors, at the boundary plating layer 50, since there is a large variation in the chemical composition, it is difficult to clearly identify the chemical composition at the boundary plating layer 50. On this point, in the welded joint 100 of the present disclosure, there is no need for the chemical composition of the boundary plating layer 50 to be identified. The average chemical composition of the first plating layer 11 and second plating layer 21 need only be identified. That is, by the Relation I being satisfied regarding the first plating layer 11 and second plating layer 21, the chemical composition of the boundary plating layer 50 can easily be made a chemical composition effective for inhibition of LME cracking.

As explained above, the chemical composition of the boundary plating layer 50 is not particularly limited. The boundary plating layer 50 may have the following chemical composition at least at part. Alternatively, the boundary plating layer 50 may also have the following chemical composition as the average chemical composition.

(Mg/Zn: 0.001 to 0.010)

In the welded joint 100, the mass ratio Mg/Zn of Mg and Zn at the boundary plating layer 50 may be 0.001 or more and 0.010 or less at least at part of the boundary plating layer 50 or as the average chemical composition of the boundary plating layer 50. The corrosion resistance is easily improved by Mg being contained in such a predetermined range of amount at the boundary plating layer 50. The mass ratio Mg/Zn of the Mg and Zn at the boundary plating layer 50 may be 0.002 or more or 0.003 or more or may be 0.009 or less, 0.008 or less, 0.007 or less, 0.006 or less, or 0.005 or less.

(Fe: 65.0 Mass % or Less)

The boundary plating layer 50 may have a concentration of Fe at least at part or in the average chemical composition of 65.0 mass % or less, 55.0 mass % or less, 45.0 mass % or less, 35.0 mass % or less, 25.0 mass % or less, 15.0 mass % or less, 12.0 mass % or less, 10.0 mass % or less, 8.0 mass % or less, or 6.0 mass % or less. As explained above, the boundary plating layer 50 is formed due to the melting and intermixture of the metal components derived from the plating layers 11, 21 and the metal components derived from the steel sheets 10, 20 at the time of spot welding. That is, at the time of spot welding, Fe may diffuse from the steel sheets 10, 20 to the boundary plating layer 50. According to new findings of the inventors, if the concentration of Fe copresent with liquid phase Zn is low at the time of spot welding (that is, if the diffusion of Fe from the steel sheets 10, 20 to the boundary plating layer 50 is small), penetration of Zn in the steel sheets 10, 20 tends to be inhibited. To inhibit the diffusion of Fe from the steel sheets 10, to the boundary plating layer 50, for example, it is effective to perform the later explained internal oxidation treatment on at least one of the steel sheets 10, 20. Note that, even if Fe were included in large amounts in the plating layers 11, 21 before welding by hot stamping etc., the concentration of Fe copresent with liquid phase Zn at the time of welding will not necessarily be high. This is because the Fe diffused in the plating layers 11, 21 due to hot stamping etc. can form high melting point intermetallic compounds together with other metals, so it becomes difficult to melt at the time of welding.

(Other Components)

In the boundary plating layer 50, the contents of the components other than the above components are not particularly limited. For example, the boundary plating layer 50 may contain Al in 0.500 mass % or more and 90.0 mass % or less in at least part of it or in average chemical composition. It may also contain Si in 0.001 mass % or more and 10.0 mass % or less. Further, as explained above, the boundary plating layer 50 may contain other elements or impurities derived from the plating layers 11, 21 and the steel sheets 10, 20. The microstructure of the boundary plating layer 50 is not particularly limited.

(Oxides)

The boundary plating layer 50 may have one or more oxides with a long diameter of 0.5 μm or more. That is, if examining the cut cross-section of the boundary plating layer 50, there may be oxides with a long diameter of 0.5 μm or more. Further, the boundary plating layer 50 may have two or more, three or more, five or more, 10 or more, or 20 or more oxides with a long diameter of 0.5 μm or more. Furthermore, the boundary plating layer 50 may have two or more, three or more, five or more, 10 or more, or 20 or more oxides with a long diameter of 1.5 μm or more. As explained later, if internally oxidizing at least one of the steel sheets 10, 20, at the time of spot welding, internal oxides can diffuse from the steel sheets 10, 20 to the boundary plating layer 50. The internal oxides can be obtained by performing predetermined annealing on the steel material (including pretreatment of annealing). Oxides contain, in addition to oxygen, one or more of the elements contained in the steel sheets 10, 20 and typically include Si, O, and Fe and in some cases further Mn. More specifically, the oxides typically may include Si: 5 to 25%, Mn: 0 to 10%, O: 40 to 65%, and Fe: 10 to 30%. The oxides may contain the above-mentioned elements in addition to these elements. The oxides may also be oxides containing Si and/or Mn. The oxides containing Si and/or Mn can promote formation of an insulation coating of corrosion products in a corrosive environment. Due to this, sometimes the corrosion resistance of the welded joint 100 is improved. Further, the "long diameter" of an oxide means the length of the largest line segment cutting across the oxide. The shape of the oxides is not particularly limited. It may be a circular shape, substantially circular shape, elliptical shape, polygonal shape, etc. The long diameter of the oxides may be 0.7 μm or more, 1.0 μm or more, or 1.5 μm or more. The upper limit of the long diameter of oxides is not particularly limited, but, for example, may be 10.0 μm or less.

1.6. Zn Penetrated Part

As shown in FIGS. 2 and 3, in the welded joint 100, there is a Zn penetrated part 60 present at least at one of the first steel sheet 10 and second steel sheet 20 adjoining the boundary plating layer 50. The Zn penetrated part 60 advances from the boundary plating layer 50 along the steel grain boundary. The Zn penetrated part 60 may be formed by the Zn contained in a plating layer penetrating the steel grain boundary of a steel sheet at the time of spot welding. Note that, just because there is a Zn penetrated part 60 present at the welded joint 100, this does not mean it leads to LME cracking.

The length of the Zn penetrated part 60 along the grain boundary is not particularly limited, but, for example, may be 0.5 μm or more, 1 μm or more, 2 μm or more, or 3 μm or more and may be 30 μm or less, 15 μm or less, 10 μm or less, or 5 μm or less. The shape, direction of penetration, etc. of the Zn penetrated part 60 may be determined in accordance with the form of the grain boundary of the steel sheets.

As shown in FIG. 2, the Zn penetrated part 60 may include a first part 61 formed by diffusion of a liquid phase including components derived from the plating layers 11, 21 at the time of spot welding and a second part 62 formed by diffusion of a solid phase including components derived from the plating layers 11, 21 at the time of spot welding. The first part 61 may be present more at the surface side of the steel sheets than the second part 62. Further, as shown in FIG. 2, the Zn penetrated part 60 has a front end part 60a. Here, in the present application, the Zn concentration is measured from the surface side of a steel sheet toward the inside along the steel grain boundary where Zn has penetrated until the Zn concentration becomes 0.1 mass % or less. The position where the Zn concentration becomes 0.1 mass % (0.095 to 0.104% in range) is deemed the "front end part 60a of the Zn penetrated part 60" and the later explained Mg concentration is measured. The main component at the front end part 60a may be Fe.

At the Zn penetrated part 60, the Mg concentration at the front end part 60a is 0.20 mass % or less. If the Mg concentration at the front end part 60a is a predetermined concentration or less, the state where Zn has difficulty penetrating the grain boundary is secured and it is said that Zn can stop at the shallow parts of the grain boundary, so LME cracking becomes hard to occur. Specifically, if the Mg concentration at the front end part 60a of the Zn penetrated part 60 becomes high, Zn diffusion to the inside of the steel grains is obstructed and a Zn penetrated part containing a high concentration of Zn is easily formed. That is, if the Mg concentration becomes high, LME cracking occurs more easily, while if keeping the Mg concentration low, LME cracking occurs with greater difficulty.

As explained later, in the welded joint 100, at least one of the first steel sheet 10 and second steel sheet 20 may be internally oxidized. In this case, it becomes hard for the Zn to form a liquid phase on the surface layers of the steel sheets 10, 20. Further, if using the internally oxidized steel sheets 10, 20 to form a welded joint 100, even if the Zn or Mg in the plating layers 11, 21 becomes a liquid phase at the time of spot welding, the liquid phase of Zn or Mg easily dwells in a high concentration near the surfaces of the steel sheets 10, 20 and the liquid phase of Zn or Mg has difficulty penetrating deep into the grain boundary. As a result, the Mg concentration at the front end part 60$a$ of the Zn penetrated part 60 can easily become lower. The Mg concentration at the front end part 60$a$ may be 0.15 mass % or less or 0.10 mass % or less.

The Zn penetrated part 60 may contain components other than Zn and Mg. For example, the Zn penetrated part 60 may also contain Al, Si, Fe, etc. Further, the Zn penetrated part 60 may also contain other elements or impurities derived from the plating layers or the steel sheets. The microstructure of the Zn penetrated part 60 is not particularly limited.

1.7. Supplemental

As explained above, in the welded joint 100, at least one of the first steel sheet 10 and second steel sheet 20 may be internally oxidized. For example, in the welded joint 100, at least one of the first steel sheet 10 and second steel sheet 20 may have an internal oxide layer having a depth of 1.5 μm or more and 20.0 μm or less. More specifically, for example, the welded joint 100 may be one having an internal oxide layer having a depth of 1.5 μm or more and 20.0 μm or less at the surface of the first steel sheet 10 facing the second steel sheet 20. Further, the "depth" of the internal oxide layer means the depth from the surface of the steel sheet (base metal). If at least one of the first steel sheet 10 and second steel sheet 20 has a predetermined internal oxide layer, as explained above, the Mg concentration at the front end part 60$a$ of the Zn penetrated part 60 easily becomes low and LME cracking is easily inhibited. In particular, LME cracking at steel sheets having internal oxide layers is easily inhibited.

As explained above, in the welded joint 100, both of the first plating layer 11 and second plating layer 21 may be provided. For example, the surface of the first steel sheet 10 facing the second steel sheet 20 may have the first plating layer 11. Further, the surface of the second steel sheet 20 facing the first steel sheet 10 may have the second plating layer 21. Further, at least one of the first plating layer 11 and second plating layer 21 may have both of Zn and Mg. Furthermore, the boundary plating layer 50 may contain components derived from the first plating layer 11 and components derived from the second plating layer 21.

In the above explanation, a mode where the welded joint 100 was provided with the first steel sheet 10 and second steel sheet 20 was explained, but the welded joint 100 may further be provided with steel sheets other than the first steel sheet 10 and second steel sheet 20 in addition to the same. That is, the welded joint 100 may also be one comprised of three or more steel sheets superposed and joined by spot welding. Further, the welded joint 100 may be one having a plurality of spot welded parts. Whatever the case, the welded joint 100 need only have at least in part a part deemed the first steel sheet 10, second steel sheet 20, spot welded part 30, and boundary plating layer 50. That is, if a plurality of spot welded parts are provided, at part of the plurality of boundary plating layers, there may be ones where the conditions of the above boundary plating layer 50 are not satisfied.

2. Method of Production of Welded Joint

The method of production of the welded joint 100 may include (1) producing a first steel sheet 10 and second steel sheet 20, wherein a first plating layer 11 is provided on the surface of the first steel sheet 10 facing the second steel sheet 20, no plating layer is present on or a second plating layer 21 is provided on the surface of the second steel sheet 20 facing the first steel sheet 10, and at least one of the first plating layer 11 and the second plating layer 21 contains Zn and Mg, and (2) superposing the first steel sheet 10 and the second steel sheet 20 so as to sandwich the plating layer, then spot welding. Below, one example of the method of production of the welded joint 100 will be explained, but the welded joint 100 may also be produced by a method other than that.

2.1. Production Conditions of Steel Sheets

A steel sheet can, for example, be obtained by a casting step of casting molten steel adjusted in composition to form a steel slab, a hot rolled step of hot rolling the steel slab to obtain a hot rolled steel sheet, a coiling step of coiling the hot rolled steel sheet, a cold rolling step of cold rolling the coiled hot rolled steel sheet to obtain a cold rolled steel sheet, a pretreatment step of pretreating the cold rolled steel sheet, and an annealing step of annealing the pretreated cold rolled steel sheet. Alternatively, it is possible to not coil the sheet after the hot rolling step, but pickle it and perform the cold rolling step as it is. After that, the surface of the steel sheet is plated so as to produce a steel sheet having a plating layer.

(Casting Step)

The conditions of the casting step are not particularly limited. For example, after smelting by a blast furnace, electric furnace, etc., it is possible to perform various secondary refining and then cast a slab by the usual continuous casting, by the ingot method, or by other method.

(Hot Rolling Step)

The steel slab cast in the above way can be hot rolled to obtain a hot rolled steel sheet. The hot rolling step is performed by hot rolling the cast steel slab directly or by reheating after cooling once. If reheating, the heating temperature of the steel slab may for example be 1100° C. to 1250° C. At the hot rolling step, usually rough rolling and finish rolling are performed. The temperature and rolling reduction of each rolling may be suitably changed in accordance with the desired metal structure or sheet thickness. For example, the end temperature of the finish rolling may be 900 to 1050° C. and the rolling reduction of the finish rolling may be 10 to 50%.

(Coiling Step)

The hot rolled steel sheet can be coiled at a predetermined temperature. The coiling temperature may be suitably changed in accordance with the desired metal structure etc. For example, it may be 500 to 800° C. It is also possible to apply predetermined heat treatment to the hot rolled steel sheet before coiling or by uncoiling after coiling. Alternatively, the coiling step need not be performed and it is also possible to pickle the sheet after the hot rolling step and then perform the later explained cold rolling step.

(Cold Rolling Step)

After pickling the hot rolled steel sheet etc., the hot rolled steel sheet can be cold rolled to obtain a cold rolled steel sheet. The rolling reduction of the cold rolling may be suitably changed in accordance with the desired metal structure or sheet thickness. For example, it may be 20 to 80%. After the cold rolling step, for example, the sheet may be air cooled for cooling down to room temperature.

(Pretreatment Step)

If performing a predetermined pretreatment step before annealing the cold rolled steel sheet, the external oxide film etc. formed on the surface of the steel sheet in the above rolling step are suitably removed, oxygen easily penetrates the inside of the steel at the time of annealing, and formation of oxides at the inside of the steel sheet is easily promoted. Further, by introducing strain at the surface layer of the steel sheet etc., it is also possible to promote the formation of oxides at the inside of the steel sheet. That is, if performing such a pretreatment step, the desired internal oxides are easily formed at the later explained annealing step. The pretreatment step may include grinding using a brush etc. or electrolysis. For example, grinding may include coating an aqueous solution containing NaOH in 0.5 to 4.0 mass % on the cold rolled steel sheet and brush grinding by a brush reduction of 0.5 to 4.0 mm and a rotation of 200 to 1200 rpm, and electrolysis may include, for example, running a current through the cold rolled steel sheet in a solution having a pH 8.0 or more. The current density at the time of electrolysis may be 1.0 to 8.0 A/dm$^2$. The electrolysis time may be 5 to 10 seconds. By running a current while controlling the pH, current density, and electrolysis time, it is possible to efficiently form internal oxides in the later explained annealing step.

(Annealing Step)

The annealing is preferably, for example, performed in a state given a tension of 0.1 to 20 MPa. If applying tension at the time of annealing, it becomes possible to more effectively introduce strain to the steel sheet and oxides are easily formed inside the steel sheets.

To suitably form internal oxides, the holding temperature at the annealing step may be 700 to 900° C., preferably 720 to 870° C. By making it such a range, it is possible to inhibit the formation of an external oxide layer and form oxides inside of the steel sheet. If the above holding temperature is less than 700° C., the desired internal oxides may not be sufficiently formed at the time of annealing. If the holding temperature is more than 900° C., an external oxide layer is easily formed at the time of annealing. The temperature raising rate to the holding temperature is not particularly limited, but may be 1 to 10° C./sec. Further, the temperature raising may be performed in two stages by a first temperature raising rate of 1 to 10° C./sec and a second temperature raising rate of 1 to 10° C./sec different from the first temperature raising rate.

The holding time at the holding temperature of the annealing step may be 10 to 300 seconds and may be 30 to 250 seconds. By making it such a range, it is possible to inhibit formation of an external oxide layer and form oxides at the inside of the steel sheet. If the above holding time is less than 10 seconds, the desired internal oxides may not be sufficiently formed at the time of annealing. If the holding time is more than 300 seconds, an external oxide layer is easily formed at the time of annealing.

From the viewpoint of making internal oxides be sufficiently formed, the dew point of the atmosphere in the annealing step may be −20 to 10° C., preferably −10 to 5° C.

Note that, before performing the annealing step, it is possible to remove the oxides (typically including grain boundary type oxides) which are formed inside the steel sheet in the steps before the annealing step. During the above-mentioned rolling steps, in particular the hot rolling step, sometimes an internal oxide layer is formed at the surface layer of the steel sheet. Such an internal oxide layer formed in the rolling steps is liable to obstruct the formation of an internal oxide layer at the annealing step, so the internal oxide layer may also be removed by pickling etc. before the annealing. For example, it is possible to anticipate the growth of the internal oxide layer in the annealing step and make the depth of the layer of the internal oxides of the cold rolled steel sheet before the annealing step 1.5 μm or less, 1.0 μm or less, 0.5 μm or less, 0.3 μm or less, 0.2 μm or less, or 0.1 μm or less.

As explained above, in producing the steel sheets 10, 20, it is effective to form internal oxides at the surface layers of the steel sheets (for example, the regions down to 20 μm from the surfaces of the steel sheets, that is, the insides of the steel sheets). For example, if desiring to inhibit LME cracking at the first steel sheet 10, it is possible to form the above internal oxides at the surface layer of the first steel sheet 10. As such internal oxides, granular type oxides dispersed in granular shapes inside the crystals of the steel or on the crystal grain boundary, grain boundary type oxides present along the crystal grain boundary of the steel, and/or dendrite type oxides present in dendrite shapes inside the crystal grains, etc. may be mentioned. If internally oxidizing the steel sheets 10, 20, for example, the Si contained in the steel sheets 10, 20 is oxidized and the surface layers of the steel sheets 10, 20 become states depleted in dissolved Si at the surface layers. According to new findings of the inventors, if dissolved Si becomes depleted at the surface layers of the steel sheets 10, 20, Zn has difficulty forming a liquid phase at the surface layers of the steel sheets 10, 20. That is, in the welded joint 100, if at least one of the first steel sheet 10 and second steel sheet 20 is suitably internally oxidized, Zn has difficulty forming a liquid phase at the surface layers of the steel sheets 10, 20. As a result, Zn has difficulty penetrating to the insides of the steel sheets 10, 20 and LME cracking is inhibited. If oxides are formed in film shapes on the surfaces (outsides) of the steel sheets 10, 20, that is, if external oxide layers are formed, such an effect is hard to obtain.

2.2. Plating Step

By the plating step, plating layers are formed on the surfaces of the steel sheets. The plating step may be performed in accordance with a method which is known by a person skilled in the art. The plating step may, for example, be performed by melt plating, may be performed by electroplating, and may be performed by evaporation plating. Preferably, the plating step is performed by melt plating. The conditions of the plating step may be suitably set considering the composition of components, thickness, amount of deposition, etc. of the desired plating layers. After the plating, alloying may be performed. Typically, the conditions of the plating step are set so as to form plating layers containing Al: 0 to 90.0%, Mg: 0 to 60.0%, Fe: 0 to 15.0%, and Si: 0 to 10.0% and having a balance of Zn and impurities.

2.3. Spot Welding Conditions

After producing the steel sheets 10, 20 in the above way, the steel sheets 10, 20 are superposed and at least one part is spot welded. The conditions of the spot welding may be conditions known to persons skilled in the art. For example, the spot welding can be performed using dome radius type tip diameter 6 to 8 mm welding electrodes at a pressure of 1.5 to 6.0 kN, weld time of 0.1 to 1.0 second (5 to 50 cycles, power frequency 50 Hz), and weld current of 4 to 15 kA.

As explained above, like in the welded joint 100 of the present disclosure, by the first plating layer 11 and second plating layer 21 satisfying the predetermined Relation I and a predetermined or less Mg concentration being satisfied at the front end part 60a of the Zn penetrated part 60, LME cracking is easy to inhibit and excellent corrosion resistance is easily secured.

3. Application of Welded Joint

The welded joint 100, as explained above, is easy to inhibit in LME cracking and has excellent corrosion resistance and can be used for various applications. For example, it is preferably used for an automobile member. In a preferable mode, the automobile member is provided with the welded joint 100, wherein the first steel sheet 10 is arranged at the outside of the vehicle, the second steel sheet 20 is arranged at the inside of the vehicle, and the Mg composition of the second plating layer 21 is lower than the Mg composition of the first plating layer 11. Further, in the automobile member, the [Mg composition of first plating layer (mass %)]/[Zn composition of first plating layer (mass %)] may be larger than 0.01.

An automobile member is comprised of a plurality of steel sheets. In an automobile member, when superposing the steel sheets, the steel sheet arranged at the outside of the vehicle is requested to have a higher corrosion resistance than the steel sheet arranged at the inside of the vehicle. To meet this request, it is sufficient to place a high Mg plating layer at the surface of the steel sheet arranged at the outside of the vehicle. On the other hand, from the viewpoint of the corrosion resistance, the steel sheet arranged at the inside of the vehicle does not have to be raised in content of Mg contained in the plating layer compared with the steel sheet arranged at the outside of the vehicle. If LME cracking is a concern at the welded part with the steel sheet arranged inside side of the vehicle due to the high Mg plating layer at the surface of the steel sheet arranged at the outside of the vehicle, if making the ratio of contents of Mg/Zn of the plating layer at the outside of the vehicle at the steel sheet arranged at the inside of the vehicle and the thickness (amount of deposition) of the plating layer, ranges satisfying the above Relation I, it is possible to achieve both corrosion resistance of the automobile member and soundness of the welded part. Furthermore, as in the above preferable mode, even assuming the first plating layer has a composition where occurrence of LEM cracking is a concern, inhibition of LME cracking is possible by keeping down the Mg composition of the second plating layer. Further, even if the composition of the first plating layer is one with an amount of Mg with no occurrence of LME cracking on its own, the welded part can be kept from becoming insufficient in corrosion resistance by adjusting the composition and amount of deposition of the second plating layer.

Figure 4:
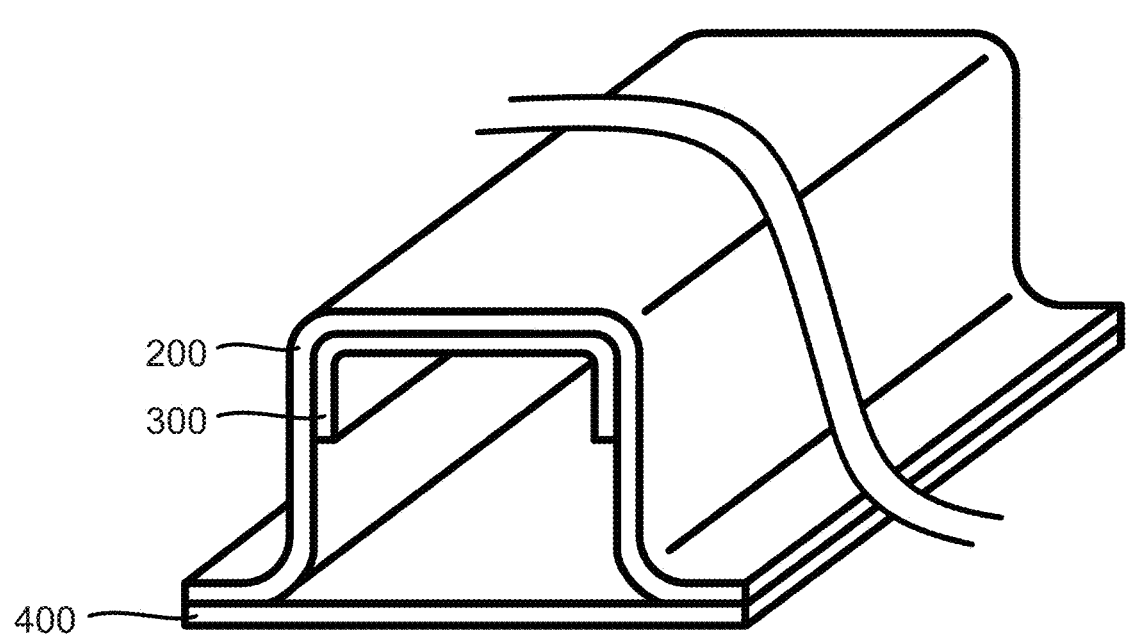
FIG. 4 schematically shows one example of the configuration of an automobile member.

The welded joint 100 of the present disclosure can be applied to all sorts of automobile members comprised of a first steel sheet 10 and second steel sheet 20 joined through a spot welded part 30. FIG. 4 shows an automobile member 1000 according to one embodiment. As shown in FIG. 4, the automobile member 1000 may be one comprised of a trapezoidal member 200 arranged at the outside of the vehicle and a reinforcement member 300 and closing plate 300 arranged at the inside of the vehicle. The automobile member 1000 may be one not provided with the reinforcement member 300. In the automobile member 1000, for example, the trapezoidal member 200 may correspond to the first steel sheet 10 in the above welded joint 100. Further, in the automobile member 1000, for example, the reinforcement member 300 may correspond to the second steel sheet 20 in the above welded joint 100. Further, in the automobile member 1000, for example, the closing plate 400 may correspond to the second steel sheet 20 in the above welded joint 100.

EXAMPLES

Below, examples will be shown while further explaining the effects due to the welded joint of the present disclosure, but the welded joint of the present disclosure is not limited to these examples.

1. Production of Steel Sheets

Molten steel adjusted in composition was cast to form a steel slab. The steel slab was hot rolled and pickled, then was cold rolled to obtain cold rolled steel sheets. Next, these were air cooled down to room temperature. The cold rolled steel sheets were pickled to remove the internal oxide layers formed by rolling. Next, some of the cold rolled steel sheets were ground down by brushes and electrolyzed. The brush grinding was performed twice by coating the cold rolled steel sheets with an aqueous solution containing NaOH 2.0% and grinding by a brush reduction of the steel sheets of 2.0 mm and a rotation of 600 rpm. The electrolysis was performed by running a current through the cold rolled steel sheets in a solution of a pH 9.8 by a current density of 6.1 A/dm$^2$ for 7.2 seconds. After that, the sheets were annealed by a predetermined dew point, holding temperature, and holding time to prepare the final steel sheets. In all of the steel sheets, the temperature raising rate at the time of annealing was 6.0° C./sec up to 500° C. and 2.0° C./sec from 500° C. up to the holding temperature. The holding temperature was 800° C., the holding time was 100 seconds, the atmosphere during holding was N$_2$-4% H$_2$, and the dew point was 0° C. In the above annealing, some of the cold rolled steel sheets were annealed in a state given a tension of 0.5 MPa, while other cold rolled steel sheets were annealed without being given tension. Note that, for each of the steel sheets, a JIS No. 5 tensile test piece having a direction perpendicular to the rolling direction as the longitudinal direction was taken and subjected to a tensile test based on JIS Z 2241 (2011). The thicknesses of the steel sheets used were all 1.6 mm.

2. Plating

The steel sheets were cut to 100 mm×200 mm sizes, then the steel sheets were hot dip galvanized and then were alloyed. In the hot dip galvanization step, the cut samples were dipped in a 440° C. hot dip galvanization bath for 3 seconds. After dipping, they were pulled out at 100 mm/sec and controlled in amount of plating deposition by N$_2$ wiping gas. The cooling speed after plating was 10° C./sec and the samples were cooled from the plating bath temperature down to 150° C. or less to obtain the test samples. After that, some of the samples were alloyed at 500° C. to obtain alloyed Zn-based plated steel sheets.

3. Spot Welding

The Zn-based plated steel sheets were cut into 50 mm×100 mm sizes. Two samples of each were prepared. The two samples of each of the Zn-based plated steel sheet were spot welded using dome radius type tip diameter 8 mm welding electrodes at a weld angle 3°, pressure 3.0 kN, weld time 0.5 second (20 cycles, power frequency 50 Hz), weld current 7 kA, and sheet gap 0.3 mm to obtain a welded joint. Note that, the "weld angle" means how much the angle formed by an electrode and steel sheet is inclined from 90°. For example, a weld angle 3° means welding with an electrode and steel sheet contacting at an angle of 87° as is.

4. Analysis and Calculation of Metal Compositions of Plating Layers

The obtained welded joints were analyzed for the chemical composition of the first plating layer formed on the surface of the first steel sheet facing the second steel sheet and the chemical composition of the second plating layer formed on the surface of the second steel sheet facing the first steel sheet and calculated for the average Mg/Zn represented by the following formula. The analysis of composition of the first plating layer and the analysis of composition of the second plating layer covered parts 10 mm or more away from the boundary plating layer or parts not welded. The compositions of the plating layers were measured by dipping a sample cut to 30 mm×30 mm in 10% hydrochloric acid containing an inhibitor so as to make the plating layers dissolve, then analyzing the plating components dissolved in the solution by ICP.

Average Mg/Zn=[(Mg composition of the first plating layer (mass %))×(amount of deposition of the first plating layer (g/m$^2$))+(Mg composition of the second plating layer (mass %))×(amount of deposition of the second plating layer (g/m$^2$))]/[(Zn composition of the first plating layer (mass %))×(amount of deposition of the first plating layer (g/m$^2$))+(Zn composition of the second plating layer (mass %))×(amount of deposition of the second plating layer (g/m$^2$))]

5. Elementary Analysis at Front Ends of Zn Penetrated Parts

The obtained welded joints were measured for Zn concentration along the steel grain boundary where Zn penetrated until the Zn concentration became 0.1% or less. The point where the Zn concentration became 0.1% was deemed as the front end of the Zn penetrated part and the Mg concentration at the front end part was measured. Specifically, a JEM-2100F (made by JEOL Ltd.) was used for TEM examination. TEM-EDS measurement was performed to measure the Zn concentration at an acceleration voltage of 200 kV. The thin film test piece for TEM examination was obtained by examining the welded part by cross-sectional SEM examination to identify the location of the Zn penetrated part, then cutting out the field including the front end of the Zn penetrated part (size 5 to 15 μm×5 to 15 μm) by FIB processing.

6. Evaluation of Presence of LME Cracking

The spot welded parts of the obtained welded joints were examined and evaluated for presence of LME cracking. The evaluation criteria were as follows:

Evaluation AA: no LME cracking

Evaluation A: LME crack length more than 0 μm to 100 μm

Evaluation B: LME crack length more than 100 μm to 300 μm

Evaluation C: LME crack length more than 300 μm

7. Evaluation of Corrosion Resistance

The welded joints were supplied for cyclic corrosion tests in accordance with JASO (M609-91) and were evaluated for corrosion resistance of the spot welded parts by the state of corrosion of the steel materials after the 120 cycles. An evaluation use sample was examined by SEM at the cross-section of a part including the spot welded part (nugget and corona bond) and the steel sheet after the completion of the test (for example, the part such as FIG. 1). From the examined image, the maximum corrosion depth of the portion of the steel sheet in a range of 1 mm from the boundary plating layer toward the direction of the steel sheet (for example, in FIG. 1, toward the upper direction) was measured. The corrosion resistance was evaluated by the following evaluation criteria.

Evaluation A: Corrosion depth 0.3 mm or less

Evaluation B: Corrosion depth more than 0.3 mm to 0.5 mm or less

Evaluation C: Corrosion depth 0.5 mm or more

8. Results of Evaluation

The following tables show the strengths, the plating compositions, and other properties of the first steel sheets and second steel sheets employed for the welded joints, the Mg concentrations at the front end parts of the Zn penetrated parts, the results of evaluation of LME cracking for the welded joints, and the results of evaluation of the corrosion resistances at the welded joints.

TABLE 1

| No. | Class | Strength of first steel sheet (MPa) | Thickness (depth) of internal oxide layer of first steel sheet (μm) | Brush grinding Yes/no | Tension control Yes/no | Al | Mg | Si | Ca | Fe | Total % | Type of element | Zn | Single side deposition of first plating layer (g/m$^2$) |
|---|---|---|---|---|---|---|---|---|---|---|---|---|---|---|
| | | | | | | | | | | | | Others | | |
| 1 | Comp. ex. | 270 | <0.1 | No | No | 1 | 1.3 | 0 | 0 | 10 | 0 | — | Bal. | 80 |
| 2 | Ex. | 270 | <0.1 | No | No | 1 | 1 | 0 | 0 | 0.1 | 0 | — | Bal. | 25 |
| 3 | Ex. | 340 | <0.1 | No | No | 1 | 2.5 | 0 | 0 | 0.1 | 0 | — | Bal. | 25 |
| 4 | Ex. | 270 | <0.1 | No | No | 1.5 | 0.4 | 0 | 0 | 0.1 | 0 | — | Bal. | 40 |
| 5 | Ex. | 270 | <0.1 | No | No | 1.5 | 2.5 | 0 | 0 | 0.1 | 0 | — | Bal. | 40 |
| 6 | Comp. ex | 270 | <0.1 | No | No | 1.5 | 1 | 0 | 0 | 0.1 | 0 | — | Bal. | 40 |
| 7 | Comp. ex. | 270 | <0.1 | No | No | 1 | 1 | 0 | 0 | 0.1 | 0 | — | Bal. | 40 |

TABLE 1-continued

| No. | Class | Strength of first steel sheet (MPa) | Thickness (depth) of internal oxide layer of first steel sheet (μm) | Brush grinding Yes/no | Tension control Yes/no | Composition of first plating layer (mass %) | | | | | | Others | | | Single side deposition of first plating layer (g/m²) |
|---|---|---|---|---|---|---|---|---|---|---|---|---|---|---|---|
| | | | | | | Al | Mg | Si | Ca | Fe | Total % | Type of element | Zn | | |
| 8 | Ex. | 270 | <0.1 | No | No | 2 | 1.5 | 0 | 0 | 0.1 | 0 | — | Bal. | 20 |
| 9 | Ex. | 270 | <0.1 | No | No | 2 | 3 | 0 | 0 | 0.1 | 0 | — | Bal | 40 |
| 10 | Ex. | 270 | <0.1 | No | No | 2.5 | 0.9 | 0 | 0 | 0.1 | 0 | — | Bal. | 45 |
| 11 | Ex. | 270 | <0.1 | No | No | 2.5 | 3 | 0 | 0 | 0.1 | 0 | — | Bal. | 30 |
| 12 | Comp. ex | 270 | <0.1 | No | No | 1 | 2 | 0 | 0 | 0.1 | 0 | — | Bal. | 50 |
| 13 | Comp. ex. | 270 | <0.1 | No | No | 1 | 0 | 0 | 0 | 0.1 | 0 | — | Bal. | 40 |
| 14 | Ex. | 270 | <0.1 | No | No | 55 | 2 | 1.6 | 0 | 1.1 | 0 | — | Bal. | 25 |
| 15 | Ex. | 270 | <0.1 | No | No | 3 | 2 | 0 | 0 | 0.1 | 0 | — | Bal. | 40 |
| 16 | Ex. | 270 | <0.1 | No | No | 3.5 | 1.5 | 0 | 0 | 0.1 | 0 | — | Bal. | 40 |
| 17 | Ex. | 270 | <0.1 | No | No | 3.5 | 3 | 0 | 0 | 0.1 | 0 | — | Bal. | 40 |
| 18 | Ex. | 340 | <0.1 | No | No | 2 | 1.5 | 0 | 0 | 0.2 | 0 | — | Bal. | 25 |
| 19 | Ex. | 590 | 1.5 | Yes | Yes | 1 | 1 | 0 | 0 | 0.1 | 0 | | Bal. | 40 |
| 20 | Ex. | 270 | <0.1 | No | No | 1 | 0.7 | 0 | 0 | 0.1 | 0 | — | Bal. | 42 |
| 21 | Comp. ex | 270 | <0.1 | No | No | 1 | 0 | 0 | 0 | 0.1 | 0 | — | Bal. | 30 |
| 22 | Comp. ex | 270 | <0.1 | No | No | 1.5 | 1.5 | 0 | 0 | 0.1 | 0 | — | Bal. | 55 |
| 23 | Ex. | 270 | <0.1 | No | No | 3 | 0.9 | 0 | 0 | 0.1 | 0 | — | Bal. | 42 |
| 24 | Ex. | 270 | <0.1 | No | No | 1 | 0.9 | 0 | 0 | 0.1 | 0 | — | Bal. | 42 |
| 25 | Comp. ex. | 270 | <0.1 | No | No | 1 | 1.1 | 0 | 0 | 0.1 | 0 | — | Bal. | 42 |
| 26 | Ex. | 590 | 2.1 | Yes | Yes | 1 | 0.9 | 0 | 0 | 0.1 | 0 | — | Bal. | 40 |
| 27 | Ex. | 270 | <0.1 | No | No | 2 | 1 | 0 | 0 | 0.1 | 0 | — | Bal. | 15 |

TABLE 2

| No. | Class | Strength of second steel sheet (MPa) | Thickness (depth) of internal oxide layer of second steel sheet (μm) | Brush grinding Yes/no | Tension control Yes/no | Composition of second plating layer (mass %) | | | | | | Others | | | Single side deposition of second plating layer (g/m²) |
|---|---|---|---|---|---|---|---|---|---|---|---|---|---|---|---|
| | | | | | | Al | Mg | Si | Ca | Fe | Total % | Type of element | Zn | | |
| 1 | Comp. ex. | 980 | 2.1 | Yes | Yes | 0 | 0 | 0 | 0 | 0 | 0 | — | Bal. | 20 |
| 2 | Ex. | 590 | 2.5 | Yes | Yes | 0.135 | 0 | 0 | 0 | 10 | 0.001 | Ni | Bal. | 45 |
| 3 | Ex. | 780 | 2.8 | Yes | Yes | 0.135 | 0 | 0 | 0 | 11 | 0.005 | Bi | Bal. | 45 |
| 4 | Ex. | 780 | 3.1 | Yes | Yes | 0.135 | 0 | 0 | 0 | 0.1 | 0.003 | Sr | Bal. | 90 |
| 5 | Ex. | 980 | 2.2 | Yes | Yes | 0.135 | 0 | 0 | 0 | 0.1 | 0 | — | Bal. | 80 |
| 6 | Comp. ex. | 980 | 0.9 | No | Yes | 0.135 | 0 | 0 | 0 | 9 | 0 | — | Bal. | 45 |
| 7 | Comp. ex. | 980 | 0.8 | Yes | No | 0.135 | 0 | 0 | 0 | 10 | 0 | — | Bal. | 45 |
| 8 | Ex. | 780 | 2.0 | Yes | Yes | 0.135 | 0 | 0 | 0 | 11 | 0 | — | Bal. | 45 |
| 9 | Ex. | 780 | 1.5 | Yes | Yes | 0.135 | 0 | 0 | 0 | 0.2 | 0.002 | Ti | Bal. | 90 |
| 10 | Ex. | 780 | 1.5 | Yes | Yes | 45 | 0 | 5 | 0 | 50 | 0 | — | Bal. | 90 |
| 11 | Ex. | 980 | 3.1 | Yes | Yes | 0.2 | 0 | 0 | 0 | 0.1 | 0 | — | Bal. | 80 |
| 12 | Comp. ex. | 980 | 2.1 | Yes | Yes | 0.135 | 0 | 0 | 0 | 12 | 0 | — | Bal. | 45 |
| 13 | Comp. ex. | 980 | 2.5 | Yes | Yes | 0.135 | 0 | 0 | 0 | 10 | 0 | — | Bal. | 45 |
| 14 | Ex. | 980 | 2.2 | Yes | Yes | 0.2 | 0 | 0 | 0 | 0.2 | 0 | — | Bal. | 50 |
| 15 | Ex. | 980 | 2.5 | Yes | Yes | 0.2 | 0 | 0 | 0 | 0.1 | 0 | — | Bal. | 45 |
| 16 | Ex | 780 | 1.6 | Yes | Yes | 0 | 0 | 0 | 0 | 0 | 0.001 | Sn | Bal. | 25 |
| 17 | Ex. | 980 | 2.4 | Yes | Yes | 0.2 | 0 | 0 | 0 | 0.2 | 0.0002 | Mn | Bal. | 90 |
| 18 | Ex. | 340 | 2.0 | Yes | Yes | 0.135 | 0 | 0 | 0 | 10.2 | 0.0003 | Cr | Bal. | 45 |
| 19 | Ex. | 590 | 2.5 | Yes | Yes | 0.2 | 0 | 0 | 0 | 10 | 0 | — | Bal. | 45 |
| 20 | Ex. | 590 | 2.1 | Yes | Yes | Unplated material | | | | | | | | 0 |
| 21 | Comp. ex. | 980 | 2.5 | Yes | Yes | Unplated material | | | | | | | | 0 |
| 22 | Comp. ex. | 590 | 2.1 | Yes | Yes | Unplated material | | | | | | | | 0 |
| 23 | Ex. | 590 | 2.0 | Yes | Yes | Unplated material | | | | | | | | 0 |
| 24 | Ex. | 590 | 2.1 | Yes | Yes | 1 | 0.9 | 0 | 0 | 0.1 | 0 | — | Bal. | 44 |
| 25 | Comp. ex. | 590 | 2.1 | Yes | Yes | 1 | 1.4 | 0 | 0 | 0.1 | 0 | — | Bal. | 30 |
| 26 | Ex. | 590 | <0.1 | No | Yes | Unplated material | | | | | | | | 0 |
| 27 | Ex. | 780 | 1.4 | Yes | Yes | 0.135 | 0 | 0 | 0 | 11 | 0 | — | Bal. | 50 |

TABLE 3

| No. | Class | Average Mg/Zn (Relation I) | Mg concentration of front end part of Zn penetrated part (mass %) | LME | Corrosion resistance |
|---|---|---|---|---|---|
| 1 | Comp. ex. | 0.012 | 0.30 | B | A |
| 2 | Ex. | 0.004 | 0.06 | AA | A |
| 3 | Ex. | 0.010 | 0.18 | A | A |
| 4 | Ex. | 0.001 | 0.03 | AA | A |
| 5 | Ex. | 0.008 | 0.13 | A | A |
| 6 | Comp. ex. | 0.005 | 0.24 | B | A |
| 7 | Comp. ex. | 0.005 | 0.22 | B | A |
| 8 | Ex. | 0.005 | 0.05 | AA | A |
| 9 | Ex. | 0.009 | 0.04 | A | A |
| 10 | Ex. | 0.009 | 0.03 | A | A |
| 11 | Ex. | 0.008 | 0.12 | A | A |
| 12 | Comp. ex. | 0.011 | 0.21 | B | A |
| 13 | Comp. ex. | 0.000 | 0.00 | AA | B |
| 14 | Ex. | 0.008 | 0.13 | A | A |
| 15 | Ex. | 0.010 | 0.15 | A | A |
| 16 | Ex. | 0.010 | 0.13 | A | A |
| 17 | Ex. | 0.009 | 0.10 | A | A |
| 18 | Ex. | 0.006 | 0.05 | AA | A |
| 19 | Ex. | 0.005 | 0.06 | AA | A |
| 20 | Ex. | 0.007 | 0.13 | A | A |
| 21 | Comp. ex. | 0.000 | 0.00 | AA | B |
| 22 | Comp. ex. | 0.015 | 0.21 | B | A |
| 23 | Ex. | 0.009 | 0.17 | A | A |
| 24 | Ex. | 0.009 | 0.18 | A | A |
| 25 | Comp. ex. | 0.013 | 0.22 | B | A |
| 26 | Ex. | 0.009 | 0.14 | A | A |
| 27 | Ex. | 0.003 | 0.15 | A | A |

As clear from the results shown in Tables 1 to 3, it will be understood that if a welded joint satisfies the following requirements, LME cracking is remarkably inhibited and corrosion resistance is also secured (Nos. 2 to 5, 8 to 11, 14 to 19, 20, 23, 24, 26, and 27).

(1) a first plating layer is provided on a surface of a first steel sheet facing a second steel sheet, and no plating layer is present on or a second plating layer is provided on a surface of the second steel sheet facing the first steel sheet, (2) the first plating layer and second plating layer satisfy the following Relation I.

(3) a boundary plating layer is provided between the first steel sheet and the second steel sheet in a range of 0.5 mm from an end part of the corona bond toward an outside of the spot welded part, a Zn penetrated part is present at least at one of the first steel sheet and the second steel sheet adjoining the boundary plating layer, and the Zn penetrated part advances from the boundary plating layer along the steel grain boundary, and (4) an Mg concentration at a front end of the Zn penetrated part at a location where a Zn concentration is 0.1 mass % is 0.20 mass % or less.

0.010≥[(Mg composition of the first plating layer (mass %))×(amount of deposition of the first plating layer)+(Mg composition of the second plating layer (mass %))×(amount of deposition of the second plating layer)]/[(Zn composition of the first plating layer (mass %))×(amount of deposition of the first plating layer)+(Zn composition of the second plating layer (mass %))×(amount of deposition of the second plating layer)]≥0.001     Relation I:

where, if no second plating layer is present, the Mg composition, Zn composition, and amount of deposition of the second plating layer are 0.

In particular, if the first plating layer and second plating layer satisfy the following Relation I-1, the LME cracking inhibition effect becomes more superior.

0.006≥[(Mg composition of the first plating layer (mass %))×(amount of deposition of the first plating layer (g/m²))+(Mg composition of the second plating layer (mass %))×(amount of deposition of the second plating layer (g/m²))]/[(Zn composition of the first plating layer (mass %))×(amount of deposition of the first plating layer (g/m²))+(Zn composition of the second plating layer (mass %))×(amount of deposition of the second plating layer (g/m²))]0.001     Relation I-1:

Further, regarding Nos. 1 and 12, the average Mg/Zn of the plating layer was large, so the Mg concentration of the front end part of the Zn penetrated part also became large and as a result LME cracking was hard to inhibit.

Regarding Nos. 6 and 7, when the cold rolled steel sheet was internally oxidized, brushing grinding and tension control were not performed, so the form of the internal oxides could not be suitably controlled, the Mg concentration of the front end part of the Zn penetrated part became larger, and as a result LME cracking was hard to inhibit.

Regarding No. 13, the average Mg/Zn of the plating layer was 0, that is, the plating layer did not contain Mg, so sufficient corrosion resistance could not be secured.

As shown in the above Tables 1 to 3, even when there is no second plating layer, if the Relation I and the Mg concentration of the front end of the Zn penetrated part satisfy the above requirements, it is possible to achieve both inhibition of LME cracking and corrosion resistance. Here, the examples where there is no second plating layer are Nos. 20, 21, 22, 23, and 26. Among these, the Relation I and the Mg concentration of the front end of the Zn penetrated part satisfy the above requirement in Nos. 20, 23, and 26. That is, Nos. 20, 23, and 26 are Examples. These examples achieve both inhibition of LME cracking and corrosion resistance. On the other hand, No. 21 is below the lower limit of the Relation I, so sufficient corrosion resistance is not obtained. Further, No. 22 exceeds the upper limit of the Relation I. The upper limit of the Mg concentration of the front end of the Zn penetrated part is also exceeded, so LME cracking cannot be inhibited.

Further, even if both of the first plating layer and second plating layer contain Mg, if the Relation I and the Mg concentration of the front end of the Zn penetrated part satisfy the above requirements, it is possible to achieve the inhibition of LME cracking and corrosion resistance. The examples in which both the first plating layer and second plating layer contain Mg are Nos. 24 and 25. No. 24 is an example in which the Relation I and the Mg concentration of the front end of the Zn penetrated part satisfy the above requirements. No. 24 achieves both inhibition of LME cracking and corrosion resistance. On the other hand, No. 25 exceeds the upper limit of the Relation I and the upper limit of the Mg concentration of the front end of the Zn penetrated part is also exceeded, so LME cracking cannot be inhibited.

Furthermore, if giving a further detailed explanation regarding the internal oxide layer, the following results. Nos. 6 and 7 satisfy the Relation I, but the upper limit of the Mg concentration at the front end of the Zn penetrated part is exceeded, so LME cracking is not inhibited. The examples with values of the Relation I similar to Nos. 6 and 7 are Nos. 2, 18, and 19. In these examples, there is an internal oxide layer of a depth of 1.5 μm or more at least at one of the first steel sheet and second steel sheet. That is, if there is an internal oxide layer of a depth of 1.5 μm or more present, the Mg concentration of the front end of the Zn penetrated part in the case of satisfying the Relation I becomes lower than the case where there is no internal oxide layer of a depth of 1.5 μm or more and LME cracking becomes easier to inhibit. No. 27 is an example where the Relation I and the Mg concentration of the front end of the Zn penetrated part satisfy the above requirements. The examples with Mg concentration of the front end of the Zn penetrated part similar to No. 27 are Nos. 5, 15, 16, 23, 24, and 26. The values of the Relation I of these examples are about 3 times that of No. 27. That is, if like in No. 27, the depth of the internal oxide layer is less than 1.5, if the value of the Relation I is not low, the upper limit of the Mg concentration of the front end of the Zn penetrated part ends up being exceeded. From this as well, it is learned that the presence of an internal oxide layer of a depth of 1.5 μm or more contributes to inhibition of the Mg concentration of the front end of the Zn penetrated part.

REFERENCE SIGNS LIST 10 first steel sheet
11 first plating layer
20 second steel sheet
21 second plating layer
30 spot welded part
31 nugget
32 corona bond
40 separation part
50 boundary plating layer
60 Zn penetrated part
100 welded joint
200 trapezoidal member
300 reinforcement member
400 closing plate

The invention claimed is:

1. A welded joint comprising a first steel sheet, a second steel sheet, and a spot welded part joining the first steel sheet and the second steel sheet, wherein a first plating layer is provided on a surface of the first steel sheet facing the second steel sheet, no plating layer is present on or a second plating layer is provided on a surface of the second steel sheet facing the first steel sheet, the spot welded part has a nugget and a corona bond, a boundary plating layer is provided between the first steel sheet and the second steel sheet, from an end part of the corona bond to 0.5 mm from the end part of the corona bond toward an outside of the spot welded part, a Zn penetrated part is present at least at one of the first steel sheet or the second steel sheet adjoining the boundary plating layer, the Zn penetrated part advances from the boundary plating layer along a steel grain boundary, the Zn penetrated part comprising a first part in direct contact with the boundary plating layer and a front end in a direction away from the boundary plating layer and not in direct contact with the boundary plating layer, an Mg concentration at the front end of the Zn penetrated part, at a location where a Zn concentration is 0.1 mass %, is 0.20 mass % or less, and the first plating layer and the second plating layer satisfy the following Relation I:

$$0.010 \geq [(\text{Mg composition of the first plating layer (mass \%)}) \times (\text{amount of deposition of the first plating layer (g/m}^2)) + (\text{Mg composition of the second plating layer (mass \%)}) \times (\text{amount of deposition of the second plating layer (g/m}^2))] /$$

$$[(\text{Zn composition of the first plating layer (mass \%)}) \times (\text{amount of deposition of the first plating layer (g/m}^2)) + (\text{Zn composition of the second plating layer (mass \%)}) \times (\text{amount of deposition of the second plating layer (g/m}^2))] \geq 0.001 \qquad \text{Relation I:}$$

where, if no second plating layer is present, the Mg composition, Zn composition, and amount of deposition of the second plating layer are 0.

2. The welded joint according to claim 1, wherein the first plating layer and the second plating layer satisfy the following Relation I-1:

$$0.006 > [(\text{Mg composition of the first plating layer (mass \%)}) \times (\text{amount of deposition of the first plating layer (g/m}^2)) + (\text{Mg composition of the second plating layer (mass \%)}) \times (\text{amount of deposition of the second plating layer (g/m}^2))] /$$

$$[(\text{Zn composition of the first plating layer (mass \%)}) \times (\text{amount of deposition of the first plating layer (g/m}^2)) + (\text{Zn composition of the second plating layer (mass \%)}) \times (\text{amount of deposition of the second plating layer (g/m}^2))] \geq 0.001. \qquad \text{Relation I-1:}$$

3. The welded joint according to claim 1, wherein at least one oxide with a long diameter of 0.5 μm or more is present in the boundary plating layer, wherein the long diameter represents a length of a largest line segment cutting across the at least one oxide.

4. The welded joint according to claim 1, wherein the welded joint has an internal oxide layer of a depth of 1.5 μm or more and 20.0 μm or less on the surface side of the first steel sheet facing the second steel sheet.

5. The welded joint according to claim 1, wherein the tensile strength of any of the first steel sheet and the second steel sheet which has the Zn penetrated part is 590 MPa or more.

6. An automobile member comprising the welded joint of claim 1, wherein the first steel sheet is arranged at the outer side of the vehicle, the second steel sheet is arranged at the inner side of the vehicle, and the Mg composition of the second plating layer is lower than the Mg composition of the first plating layer.

7. The automobile member according to claim 6, wherein the [Mg composition of the first plating layer (mass %)]/[Zn composition of the first plating layer (mass %)] is larger than 0.01.

8. The welded joint according to claim 2, wherein at least one oxide with a long diameter of 0.5 μm or more is present in the boundary plating layer, wherein the long diameter represents a length of a largest line segment cutting across the at least one oxide.

9. The welded joint according to claim 2, wherein the welded joint has an internal oxide layer of a depth of 1.5 μm or more and 20.0 μm or less on the surface side of the first steel sheet facing the second steel sheet.

10. The welded joint according to claim 3, wherein the welded joint has an internal oxide layer of a depth of 1.5 μm or more and 20.0 μm or less on the surface side of the first steel sheet facing the second steel sheet.

11. The welded joint according to claim 2, wherein the tensile strength of any of the first steel sheet and the second steel sheet which has the Zn penetrated part is 590 MPa or more.

12. The welded joint according to claim 3, wherein the tensile strength of any of the first steel sheet and the second steel sheet which has the Zn penetrated part is 590 MPa or more.

13. The welded joint according to claim 4, wherein the tensile strength of any of the first steel sheet and the second steel sheet which has the Zn penetrated part is 590 MPa or more.

14. An automobile member comprising the welded joint of claim 2, wherein the first steel sheet is arranged at the outer side of the vehicle, the second steel sheet is arranged at the inner side of the vehicle, and the Mg composition of the second plating layer is lower than the Mg composition of the first plating layer.

15. An automobile member comprising the welded joint of claim 3, wherein the first steel sheet is arranged at the outer side of the vehicle, the second steel sheet is arranged at the inner side of the vehicle, and the Mg composition of the second plating layer is lower than the Mg composition of the first plating layer.

16. An automobile member comprising the welded joint of claim 4, wherein the first steel sheet is arranged at the outer side of the vehicle, the second steel sheet is arranged at the inner side of the vehicle, and the Mg composition of the second plating layer is lower than the Mg composition of the first plating layer.

17. An automobile member comprising the welded joint of claim 5, wherein the first steel sheet is arranged at the outer side of the vehicle, the second steel sheet is arranged at the inner side of the vehicle, and the Mg composition of the second plating layer is lower than the Mg composition of the first plating layer.

* * * * *